United States Patent [19]

Kuhar

[11] 4,110,413

[45] Aug. 29, 1978

[54] THERMOPLASTIC HIGH ACRYLONITRILE RESINS

[75] Inventor: George A. Kuhar, Greensburg, Ohio

[73] Assignee: The Goodyear Tire & Rubber Company, Akron, Ohio

[21] Appl. No.: 672,360

[22] Filed: Mar. 31, 1976

Related U.S. Application Data

[63] Continuation of Ser. No. 553,776, Feb. 27, 1975, abandoned.

[51] Int. Cl.$^2$ .............................................. C08L 33/20
[52] U.S. Cl. ..................................... 260/879; 260/881; 260/887; 260/898; 526/201
[58] Field of Search ................ 526/201, 342; 260/879, 260/880 R, 881, 882, 883, 887, 898

[56] References Cited

U.S. PATENT DOCUMENTS

| | | | |
|---|---|---|---|
| 2,763,631 | 9/1956 | Coover | 260/881 |
| 2,949,437 | 8/1960 | Hobson | 260/898 |
| 3,647,773 | 3/1972 | Ohe | 260/85.5 N |
| 3,863,014 | 1/1975 | Mottus | 526/201 |
| 3,929,710 | 12/1975 | Nield | 526/342 |
| 3,951,932 | 4/1976 | Coffey | 526/342 |
| 4,002,812 | 1/1977 | Hendy | 526/342 |

*Primary Examiner*—Paul R. Michl
*Attorney, Agent, or Firm*—H. C. Young, Jr.

[57] ABSTRACT

This invention concerns a method of polymerizing high acrylonitrile resins in the presence of polymerized copolymers or terpolymers to produce thermoplastic products susceptible to molding and processing operations and having high impact strength and high heat distortion temperatures.

6 Claims, No Drawings

THERMOPLASTIC HIGH ACRYLONITRILE RESINS

This is a continuation of application Ser. No. 553,776 filed Feb. 27, 1975 now abandoned.

This invention relates to thermoplastic high acrylonitrile resins and to a process for their preparation. More specifically it relates to a process for producing a high acrylonitrile resin that can be easily processed and molded.

Acrylonitrile has long been known for its ability to undergo polymerization to an extent sufficient to form extremely high molecular weight products having unique properties such as high heat distortion temperatures, chemical resistance, outdoor durability and hard, tough surfaces having good tensile strength. Acrylonitrile is utilized for these properties in current applications such as adhesives and cements. Use of acrylonitrile in fiber technology is limited because of processing problems in spinnerettes and coagulation baths. Other potential uses have not been practical in current applications because of the high molecular weight and extreme toughness of the high acrylonitrile resins which make such resins nearly impossible and commercially impractical to process.

Early attempts to overcome the processing and molding difficulties inherent in high acrylonitrile resins included polymerizing the acrylonitrile in a mold designed to determine the final shape of the finished article. This procedure normally utilized bulk polymerization methods which were initiated using radiation. The resulting product had a shape near the final dimensions of the finished article and required little finishing. Such procedures were difficult to manipulate and were costly. Acrylonitrile resins tend to char rather than melt when exposed to elevated temperatures, thus increasing the processing difficulties.

It is therefore an object of the present invention to provide a process for the preparation of thermoplastic acrylonitrile resins susceptible to conventional processing methods. Other objects will become apparent to those skilled in this art as the description proceeds.

It has now been discovered in accordance with the present invention that when acrylonitrile or a high acrylonitrile-content copolymer is polymerized in the presence of a polymerized copolymer or terpolymer the resulting resin has thermoplastic properties which allow its processing by conventional means. The copolymers or terpolymers also reduce the need for conventional suspending agents and in some cases eliminate their use entirely.

The acrylonitriles referred to in this disclosure are polyacrylonitrile and copolymers of acrylonitrile and common comonomers. Usually not more than 10 parts of comonomers are used. Combinations of comonomers can be used so long as their aggregate does not exceed 10 parts. More than 400 comonomers for acrylonitrile are known. Representative examples of comonomers useful in the present invention are butyl acrylate, butyl methacrylate, vinylidene chloride, styrene, ethyl acrylate, methacrylonitrile, 2-ethylhexylacrylate, methyl acrylate, 2-ethylhexylvinylether, decylvinylether, isobutylvinylether, laurylvinylether, ethylvinylether, diethylaminoethylvinylether and hydroxybutylvinylether.

The process comprises adding from 1.5 to 90 parts by weight of a finely divided polymerized copolymer or terpolymer to the reaction chamber of a bulk or suspension reaction system and carrying out the polymerization using conventional free radical initiators and suspending agents. Recipe adjustments can be made to lower the use of the polymeric suspending agents of this invention although their presence in excess usually does not adversely affect the reaction. Conversely, conventional suspending agents such as polyvinyl alcohol have a tendency to darken acrylonitrile resins when processed in the usual temperature range. This darkening intensifies the normal darkening characteristics of high-acrylonitrile polymers at temperatures where processing is carried out and is undesirable.

Representative examples of copolymers and terpolymers useful in the practice of the present invention are polyvinylchloride resins, styrene/acrylonitrile resins and acrylonitrile/butadiene/styrene resins.

Usually the high acrylonitrile resin is polymerized by placing acrylonitrile in a concentration of from 90 to 100 parts of acrylonitrile in a reactor along with from 1.5 to 90 parts by weight of at least one monomer. In a suspension system from 150 to 300 parts by weight of water can be used. At the time the polymerization ingredients are charged into the reactor, from about 1.5 to about 90, but preferably from about 2.0 to about 20 parts by weight of finely divided polymerized resin is introduced to act as a suspending agent during the polymerization and as a processing aid in the final product. The reaction will then yield a high acrylonitrile resin having thermoplastic properties.

Normally the polymerization is initiated using free radical initiation. Representative examples of such initiators are gamma radiation, sodium peroxydisulfate, potassium peroxydisulfate and azobisisobutylnitrile.

Representative examples of suspending agents are methyl cellulose, tricalcium phosphate, polyvinyl alcohol resins, and foamed silica.

Acrylonitrile resins tend to form and adhere onto bare metal surfaces during polymerization. Addition of finely divided polymerized copolymers or terpolymers lessen this adherence of the newly formed resin. Use of a parting agent such as silicon spray lessens the adherence and reduces reactor cleaning. Use of glass lined reactors and agitators practically eliminates resin adherence without the use of a parting agent. The parting agent has no adverse effect on the polymerization.

The polymeric suspending agent should be finely divided. Usually a particle size of from about 30 U.S. standard mesh to about 300 U.S. standard mesh is used, but the preferred particle size is from about 50 U.S. standard mesh to about 200 U.S. standard mesh.

The polymeric resin particles act as a suspending agent and during the course of the polymerization act as nuclei for the formation of the high acrylonitrile resin. As the particle size of a given weight of the suspending agent increases, the number of available nuclei decrease, forcing the polymerization to form fewer, larger particles of the high acrylonitrile resin.

Since the suspending resins also act as processing aids, it is desirable to have as complete a dispersion with the high acrylonitrile resin as possible. Large particle size causes much of the suspending resin to be out of contact with the high acrylonitrile resin, thus removing much of the benefit of their presence.

Order of addition of ingredients of the polymerization recipe is usually not critical. Normally all ingredients are added to the reactor at once before pressurization of the reactor and initiation of the reaction as in conventional acrylonitrile polymerizations. Some conventional suspending agents, such as methyl cellulose, pounds per square inch (psi) weight in a mineral oil bath. The results are shown in Table 1.

Table 1

| | | | Physical Properties Of HI-AN-ABS | | | | | |
|---|---|---|---|---|---|---|---|---|
| | | | ASTM D-785 Rockwell Hardness | | ASTM D-256 Notched Izod Impact | ASTM D-790 Flexural | | ASTM D-648 Heat Distortion | Softening Point |
| Example | Acrylonitrile | *A/B/S | R | L | Ft.lbs/in. | Modulus | Strength | Temp. ° C. | ° C. |
| 1 | 100 | 0 | Too tough to mill. | | | | | | |
| 2 | 80 | 20 | 107 | 81 | 2.2 | 441,000 | 11,750 | 90.5 | 135 |
| 3 | 50 | 50 | 94 | 78 | 3.4 | 642,000 | 7,500 | 92 | 143 |

*Acrylonitrile/Butadiene/Styrene Resin.

require that solubility be complete before the remainder of the recipe is added to the reactor since their solubility is affected by temperature. Once solubility has been achieved, the reaction can be carried out in the same manner as other acrylonitrile polymerizations, all of which are well known and described in the art.

The reaction is more concretely described with reference to the examples below in which all parts and percentages are by weight unless otherwise specified.

EXAMPLES I - III

The effect of mill blending a very tough high acrylonitrile with various proportions of acrylonitrile/butadiene/styrene (A/B/S) resins was examined in Examples I to III. The acrylonitrile resin used in the three examples was prepared in a 5 liter glass reaction chamber to allow visual observation of the polymerization. The recipe used was water 200 parts, acrylonitrile 50-100 parts, ABS resin 3.3 parts, methyl cellulose as suspending agent 2.83 parts, and azobisisobutylnitrile 0.66 part as initiator.

All materials were charged at room temperature and nitrogen was flushed through the system. Heating and stirring were begun. A milky white color appeared in the mixture as polymerization was initiated. Small polymer particles coated by the liquid organic layer were observed on the walls of the flask in the form of sticky chains. The chains grew in length until the stirring liquid broke them into smaller sizes, which eventually formed spherical beads. As the polymerization progressed, the density of the beads increased, causing them to sink lower into the stirred mixture. The majority of the beads were at the bottom of the flask at the end of the polymerization and the cessation of agitation.

A lack of the normally expected hard precoagulum was found when the finely divided ABS resin was added to the reaction. Unreacted acrylonitrile was recovered in an 88/12 weight percent acrylonitrile/water isotrope which distilled at 71° C. and reacted in subsequent polymerizations. The resin obtained was mill blended 20 and 50 parts by weight of an A/B/S resin and tested for physical property changes.

The resins obtained by suspension polymerization described in Examples II and III wherein 100 parts of acrylonitrile were polymerized and mill blended with from 20 to 50 parts of ABS resin had improved physical properties over the 100 percent acrylonitrile polymerization. The combination of high impact resistance and high heat distortion was obtained in the high acrylonitrile resins at the expense of a slight loss in flexural modulus and flexural strength as determined by ASTM tests D-256 (Notched Izod Impact), D-790 (Flexural Strength), D-785 (Rockwell Hardness), D-648 (Heat Distortion) and D-569 (Olsen Flow). Softening Point was determined by observing the temperature at which a ⅛ × ⅛ × 2½ inches molded sample bends under an 8

In the past, physical blending of acrylonitrile and ABS resins using mechanical techniques such as a mill, indicate that a pseudo compatability occurs. Electron microscopy shows that the ABS resin lies in layers covering the tougher high acrylonitrile resin. When a composition range where the high acrylonitrile resin does not form a continuous matrix is reached, physical properties begin to drop. In contrast, polymerizing the high acrylonitrile resin in the presence of the finely divided ABS resin shows a definite increase in physical properties such as flexural modulus and heat distortion temperature while retaining the processability and manufacturing flexability which is desired. In distinct contrast, the polymerization of high acrylonitrile resins in the presence of a copolymer or terpolymer maintains processability and high physical properties. A chemical interaction takes place which binds the suspending agent into the matrix of the high acrylonitrile resin instead of merely interrupting the acrylonitrile matrix by physically blending the copolymer or terpolymer using physical means. As proportions of the copolymer or terpolymer begin to rise, physical properties of the physical blend reach a peak and decline sharply thereafter. When polymerizing high acrylonitrile resins in the presence of copolymers or terpolymer resins, the peak of desired physical properties, such as heat distortion and impact strength, remain at a high level over a broader composition range.

EXAMPLES IV - VII

The effect of chemically untreated polymerizates of high acrylonitrile with various proportions of acrylonitrile/butadiene/styrene (A/B/S) resins was examined in Examples IV-VII. The said examples were polymerized in a 5 gallon glass-lined reaction chamber. The recipe used was water 10,000 grams, acrylonitrile 2989 to 427 grams (70 to 10 parts by weight), ABS resin 1281 grams to 3843 grams (30 to 90 parts by weight), methyl cellulose as suspending agent 35 grams, and azobisisobutylnitrile 12 grams as initiator.

All materials were charged at room temperature and nitrogen was flushed through the system. Heating and stirring were begun. A temperature of 150° F. was reached during the polymerization. As the polymerization progressed, the density of the polymer formed increased, causing the polymer to sink lower into the stirred mixture. The majority of the polymer was at the bottom of the reactor at the end of the polymerization and the cessation of agitation.

The polymer formed in each of four polymerizations was tested under ASTM methods in the same manner as described in Table 1. The results are shown in Table 2.

Table 2

| An-A/B/S | Rockwell Hardness R | Rockwell Hardness L | Notched Izod Impact | Flexural Strength | Flexural Modulus | Heat Distortion °C. | Softening Point °C. |
|---|---|---|---|---|---|---|---|
| 4-10/90 | 88 | 58 | 3.50 | 7700 | 180,000 | 88 | 104 |
| 5-30/70 | 103 | 59 | .34 | 7400 | 308,000 | 90 | 102 |
| 6-50/50 | 111 | 88 | .18 | 6500 | 362,000 | 85 | 100 |
| 7-70/30 | 118 | 101 | .19 | 9080 | 447,000 | 92 | 126 |

Table 3

| Sieve analysis on Hi An-A/B/S U S Standard Screens | | |
|---|---|---|
| Through | On | Percent |
| — | 8 | 0.5 |
| 8 | 20 | 12.0 |
| 20 | 50 | 62.5 |
| 50 | 80 | 8.5 |
| 80 | 100 | 1.0 |
| 100 | Pan | 15.5 |
| | | 100.0% |

EXAMPLE VIII

The process of this invention was initiated using gamma radiation. The materials for the polymerization were run in a 5 gallon can placed next to the cobalt 60 source. No external heat was added. The recipe used was 7200 grams of water, 3000 grams of acrylonitrile, 300 grams of acrylonitrile/butadiene/styrene resin, and 30 grams of methyl cellulose suspending agent. Agitation of the contents was made until polymerization was complete. The reaction time to complete polymerization was about 24 hours.

The recovered resin had a high molecular weight and was highly crosslinked. The resins alone would not mill at 350° F. Samples for physical testing could not be prepared. Processability was obtained by mill blending the resin with an additional 10 parts of A/B/S resin obtained as Lustran I740 from Monsanto Chemical Company.

EXAMPLE IX

Acrylonitrile polymerization in the presence of A/B/S resin was carried out in a 27 gallon reactor. The reactor was thoroughly cleaned and equipped with two 9 inch axial flow turbines, one on the bottom of the reactor and one 19 inches from the reactor bottom. The entire internal surface of the reactor was sprayed with 113 grams of silicon spray parting agent. The polymerization recipe used was water 260 parts, acrylonitrile 100 parts, A/B/S resin 10 parts, methyl cellulose 1 part, and azobisisobutylnitrile 0.3 part.

The water was placed in the reactor and heated to 125° F. Methyl cellulose was added slowly with agitation (200 rpm). The A/B/S resin was added with agitation (200rpm). The reactor was then sealed and evacuated to maximum with no agitation. The acrylonitrile and azobisisobutylnitrile were premixed and sucked into the evacuated reactor. The reactor was again evacuated to maximum, nitrogen purged, and re-evacuated to maximum. Ten pounds per square inch gauge of nitrogen pressure was applied. The reaction temperature was set at 150° F. and agitation of 200 rpm was begun.

The reaction initiated and after 1¾ hours peaked at a temperature of 192° F. During this period agitation was increased to 230 rpm. At the completion of polymerization the temperature dropped to 80° F. at which time the batch was discharged and the reactor flushed with nitrogen. Total elapsed reaction time was 2¾ hours. Inspection of the opened and flushed reactor revealed that the entire contents were discharged and that all glass and steel surfaces were clean. The yield was over 85 percent. A screen analysis of the finished resin is shown in Table 3.

The high acrylonitrile-terpolymer or copolymer blends obtained by the polymerization process of this invention give processable resins having greatly improved physical properties over a wider range. Normally the products of this process have a heat distortion temperature from about 85° C. to about 105° C. and a notched Izod impact resistance strength from about 1.0 to about 3.4 ft.lbs/inch face. The copolymers and terpolymers used as suspending agents in the polymerization of high acrylonitriles have variable component ranges. The improvements produced in the physical properties of the finished high acrylonitrile resins are not appreciably affected by changes in the composition of copolymer and terpolymer resins when used as suspending agents and processing aids. The suspending resins produce the improvements in high acrylonitrile resins even though their internal composition is varied.

High acrylonitrile resins which are polymerized onto copolymer or terpolymer resins yield molded samples which are opaque but lighter in color than resins in which polyvinyl alcohol or methyl cellulose were used as the sole suspending agent. The conventional suspending agents tend to darken in color when heated into the 200° to 400° F. processing range of high acrylonitrile resins and cause discoloration. In contrast, the process of this invention allows high acrylonitrile resins to be processed without severe discoloration.

When using conventional suspending agents it is usually necessary to use chain transfer agents in order to prepare processable high acrylonitrile resins. Most common transfer agents are mercaptans which impart objectionable odors to the resins in which they are used. Use of copolymer or terpolymer resins perform the function of chain transfer agents so efficiently while acting as processing aids that the use of a chain transfer agent during polymerization is unnecessary and can be eliminated along with its accompanying objectionable features.

While certain representative embodiments and details have been shown for the purpose of illustrating the invention, it will be apparent to those skilled in this art that various changes and modifications may be made therein without departing from the spirit or scope of the invention.

What is claimed is:

1. In a method of polymerizing high acrylonitrile resins in suspension polymerization systems wherein the polymerization system contains acrylonitrile in a concentration of from 90 to 100 parts, water in a concentration of from 150 to 300 parts, and a comonomer in a concentration of from 0 to 10 parts, the improvement comprising the addition of a finely divided resin to said polymerization system having a particle size in the range of about 50 to about 200 U.S. Standard mesh selected from the group consisting of acrylonitrile/butadiene/styrene resins, and styrene/acrylonitrile resins in a concentration of from 1.5 to 90 parts by weight to act as a suspending agent during the polymerization and as a processing aid in the finished high acrylonitrile resin.

2. A method as described in claim 1 wherein the comonomer is selected from the group consisting of butyl acrylate, butyl methacrylate, vinylidene chloride, ethyl acrylate, styrene, methacrylonitrile, ethyl acrylate 2-ethylhexyl acrylate, 2-ethylhexyl vinyl ether, decyl vinyl ether, isobutyl vinyl ether, lauryl vinyl ether, ethyl vinyl ether, diethyl amino ethyl vinyl ether and hydroxy butyl vinyl ether.

3. A method as described in claim 2 wherein the polymerization is initiated using a free radical initiator selected from the group consisting of azobisisobutylnitrile, gamma radiation, sodium peroxydisulfate or potassium peroxydisulfate.

4. A method as described in claim 3 wherein the polymerization is carried out in a suspending agent selected from the group consisting of methyl cellulose, polyvinyl alcohol resin, tricalcium phosphate, and foamed silica.

5. A method as described in claim 4 wherein the polymerization is carried out at a temperature of from 120° F. to 220° F.

6. A method as described in claim 5 wherein the polymerization is carried out under nitrogen gas at a pressure of from about 1100 to about 2000 millimeters of mercury.

* * * * *